United States Patent [19]

Blackmer

[11] Patent Number: 4,632,677
[45] Date of Patent: Dec. 30, 1986

[54] HIGH HUMIDITY OXYGEN ENRICHER APPARATUS

[76] Inventor: Richard H. Blackmer, 109 Oakwood Dr., Scotia, N.Y. 12302

[21] Appl. No.: 315,444

[22] Filed: Oct. 27, 1981

[51] Int. Cl.$^4$ ............................................. B01D 53/22
[52] U.S. Cl. ...................................... 55/158; 55/269; 55/312
[58] Field of Search ................ 55/16, 158, 269, 80, 55/309, 312; 261/100, 106; 422/5

[56] References Cited

U.S. PATENT DOCUMENTS

| | | | |
|---|---|---|---|
| 1,819,643 | 8/1931 | Fleisher | 55/80 X |
| 2,208,443 | 7/1940 | Ashley | 55/312 X |
| 3,225,517 | 12/1965 | Wachsmuth | 55/80 X |
| 3,369,343 | 2/1968 | Robb | 55/158 X |
| 3,489,144 | 1/1970 | Dibelius et al. | 55/158 X |
| 3,614,856 | 10/1971 | Sanz et al. | 55/158 X |
| 3,976,451 | 8/1976 | Blackmer et al. | 55/158 |
| 3,979,190 | 9/1976 | Hedman | 55/158 |
| 4,174,955 | 11/1979 | Blackmer et al. | 55/158 |
| 4,407,134 | 10/1983 | Snaper | 55/312 X |

*Primary Examiner*—Robert Spitzer
*Attorney, Agent, or Firm*—Dennis H. Lambert

[57] ABSTRACT

An oxygen enriching apparatus for increasing the proportion of oxygen in ambient air includes means for increasing or regulating the humidity of the air. Ambient air is drawn into the apparatus by a pump and caused to flow through a membrane stack to enrich the oxygen of air flowing through the membrane stack. The enriched air is fed to first and second condenser coils and from there to water separators which separate the water and lead it to an evaporator pad. One of the coils is warmer than the other, whereby the humidity of air leaving this coil is higher than that leaving the other. A proportioning valve is connected to control the air from the coils and deliver proportions thereof to the user. Heaters may be used to heat the air delivered to the user, if desired.

6 Claims, 10 Drawing Figures

HIGH HUMIDITY OXYGEN ENRICHER APPARATUS

BACKGROUND OF THE INVENTION

1. Field Of The Invention

This invention relates to apparatus for providing oxygen enriched air through the use of permeable films or membranes, and more particularly, to such apparatus which increases or regulates the temperature and humidity of the oxygen-enriched air being delivered to a patient, and is an improvement over prior U.S. Pat. No. 4,174,955.

2. Prior Art

As is known, various types of equipment have been used to supply aged or infirm patients with oxygen or oxygen-enriched air in order to sustain life-support systems or relieve symptoms of various types of debilitating diseases, particularly of the lungs. In some cases, use has been made of pure oxygen or oxygen-enriched gases supplied from pressurized cylinders. However, such cylinders are cumbersome and have relatively short useful life.

In other cases, use has been made of machines for enriching the amount of oxygen in the air supplied to a patient. For example, as described in U.S. Pat. No. 3,976,451, use has been made of a vacuum extract machine for in-home use, under a doctor's supervision, by patients suffering respiratory ailments and requiring oxygen-enriched air. Generally, this type of machine employs a membrane oxygen enricher and does not require the storing of large volumes of oxygen under pressure. Instead, the machine operates so as to pass a continuous flow of air through permeable membrane cells which permeate oxygen more readily than nitrogen and to draw off air enriched with oxygen from the cells. The machine also employs additional apparatus to control the temperature of the atmospheric air directed to the membrane cells, in particular, a sliding valve plate arrangement which directs or diverts preheated air to the cells.

However, the arrangement of components of a machine as described in U.S. Pat. No. 3,976,451 requires a relatively large amount of space. Further, the machine has been relatively noisy in operating, for example, at a sound level detrimental to a device for in-home operation, typically about 52 dbA.

In addition, the machine employs a condenser to remove excess water vapor from the oxygen-enriched air after cooling. This excess water is usually collected in a vessel that is emptied in response to a float valve. However, such a float valve is prone to both leakage and sticking because of corrosion and wear particles in the water flow. Further, the float valve requires a large resident volume of water to operate. Such a resident volume is, however, subject to freezing and bacterial contamination.

The invention disclosed in our prior patent, U.S. Pat. No. 4,174,955, solves the problems above with respect to other prior art devices. However, it has been noted that the relatively cool temperature of the oxygen-enriched air being delivered to the patient may result in discomfort to the patient after a length of time has passed. Moreover, the relatively low absolute humidity of the air being delivered can result in respiratory irritation.

SUMMARY OF THE INVENTION

It is a principal object of this invention to provide an apparatus for enriching the oxygen content of air being delivered to a patient, and at the same time increasing or regulating the humidity of such air.

A further object of this invention is to provide an apparatus for enriching the oxygen content of air being delivered to a patient, and to increase the temperature of the oxygen-enriched air being delivered to the patient.

Yet another object of the invention is to provide an apparatus for enriching the oxygen content of air being delivered to a patient, and for increasing the humidity and temperature of the oxygen-enriched air delivered to the patient, wherein waste heat from the apparatus is used in heat exchange relationship with a high temperature condenser and with the enriched air.

These and other objects and advantages of the invention are accomplished by an oxygen-enrichment apparatus of particularly simple and compact construction. Briefly, the apparatus includes an array of membrane cells, a fan for drawing a flow of air past the cells, a vacuum pump connected to the cells to draw a flow of humidity-and-oxygen-enriched air from each cell, a low temperature condenser connected to the pump to receive a flow of humidity-and-oxygen-enriched air from the pump, a water trap connected to the condenser, means for removing water from the water trap and a connector communicating with the trap to exhaust a flow of oxygen-enriched air therethrough. A high temperature condenser is connected to receive at least part of the air drawn from the cells. This condenser is also connected with a water trap to remove excess, condensed water, and the warmed, moist air is mixed in a desired proportion with the air from the low temperature condenser before being delivered to the patient. The membrane cells each have an interior chamber and each is selectively permeable to permit oxygen and water vapor to permeate into the chamber at a greater rate than nitrogen. The pump is connected to the cell chamber to draw off the oxygen-enriched air while the low temperature condenser is disposed upstream of and in the flow of air to the membrane cells.

In particular, the apparatus includes a membrane stack box in which the cells are mounted, a cabinet core and a cabinet cover that provide a path for the flow of atmospheric air such that the overall noise level of the apparatus that would be heard by a user is significantly less that with prior art apparatus, and wherein both the temperature and humidity of the oxygen-enriched air are increased.

In operation, the fan causes a flow of atmospheric air to pass along an irregular path past the cells, where the air is divided by permeation into oxygen-enriched and oxygen-depleted portions. The oxygen-depleted portion (i.e., nitrogen-enriched portion) is directed over the pump or other suitable vacuum maintaining means to cool the pump. The oxygen-enriched portion is selectively proportioned between the low temperature condenser and the high temperature condenser. Water traps after each condenser condense out excess water vapor, and the oxygen and water vapor enriched air is then delivered via a connector to the patient. The high temperature condenser may be located in the path of air exhausted from the apparatus. The condensed excess water is fed from the water separators or traps to an evaporator pad. The amount of air passed through the high temperature coil is controlled by a proportioning valve for admixture, as desired, with the oxygen-enriched air from the low temperature condenser.

The apparatus has an easily assembled configuration that provides a significantly reduced noise level over the prior art without the need for elaborate sound insulation or baffling. In this regard, the apparatus provides a circuitous path for the air flow so that any noise which is produced in the path of the air flow is damped within the circuitous path. Also, the water traps together with the water-removing means, which is in the form of a tube with a wick therein and an evaporator pad, eliminate the need for a float-valve water removal system. The warmed, high-humidity air which is supplied to the patient by the apparatus of the present invention eliminates the discomfort and irritations to the respiratory system which are caused by prior art devices.

The apparatus operates efficiently without the need for manual or semi-automatic air temperature adjusting means since the incoming air flow is warmed by passing over the condenser in heat exchange relation to the oxygen-enriched air flow within the condenser. The membrane cells may be formed of membranes of several types, including silicone rubber, polymethylpentene, silicone-polycarbonate copolymer and polyphenylene ethers. The membrane cells are mounted in parallel, spaced-apart relationship, and the interiors of the cells are manifolded to the vacuum pump to provide a pressure differential across the cell membranes and to draw off gas, i.e. oxygen-and-water-vapor-enriched air which permeates through the cells.

Typically, about 15 cubic feet per minute under standard conditions of atmospheric air flows across the cells of which 0.3 cubic feet per minute under standard conditions permeates through the cells to provide an oxygen-and-water-vapor-enriched gas. The nitrogen-rich remainder flows past the cell array to be eventually exhausted to the atmosphere along an irregular path after assisting in cooling the vacuum source and enriched gas in the removal of condensed water vapor.

The oxygen-enriched gas is divided between the low and high temperature condenser and excess water vapor is condensed, collected and removed by the wicks and evaporated on the evaporator pad in the exhaust from the apparatus. The two gas streams are then combined. Enriched gas at a constant flow rate is divided by means of a relief valve, and a portion can be passed to a bacterial filter and a face mask or other device for inhalation by the patient.

The oxygen enricher provides a unit which operates at a noise level sufficiently low for home use, typically about 45 dbA, and produces enriched oxygen gas of high humidity as needed by the patient, limited only by the availability of electric power and the component life of the apparatus, which is well in excess of the storage capacity of individual cylinders. This increases the reliability and safety of the apparatus as well as providing an economical source of oxygen for patients requiring prolonged respiratory therapy.

BRIEF DESCRIPTION OF THE DRAWINGS

Other and further objects of this invention will become apparent from the following detailed description taken in conjunction with the drawings, in which.

DETAILED DESCRIPTION OF THE PREFERRED EMBODIMENTS

The oxygen enricher employs a vacuum extraction for drawing oxygen, water vapor, nitrogen and other gases in room air through membranes so as to produce a humid, oxygen-rich product for therapeutic administration to patients with chronic cardiopulmonary diseases. Enrichment results because oxygen and water vapor permeate through the membranes faster than nitrogen.

Figure 5:
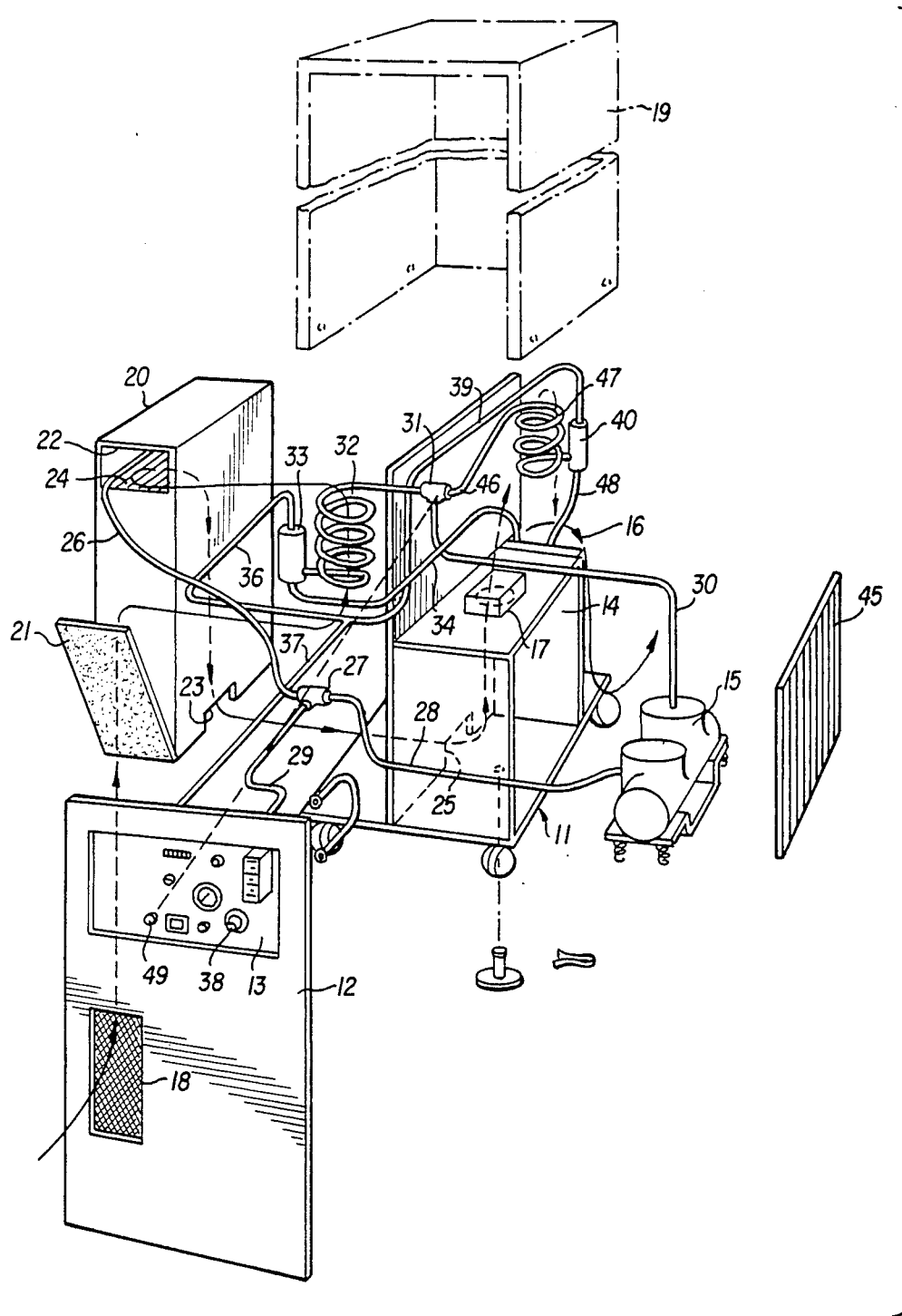
FIG. 5 is an exploded view in perspective of the elements of the apparatus.

The apparatus is indicated generally at 10, and as seen in FIG. 5, comprises a cabinet core 11 which includes a front panel 12 in which a control panel 13 is mounted and an adjacent housing structure 14 for a partial vacuum maintaining means 15, which is preferably a fixed displacement vacuum pump. The lower edge of the front panel 12 meets the lower edge of the housing structure 14, but the control panel 13 is located at a level above the housing structure 14. The front panel 12 is also wider than the housing structure 14, meeting the housing structure 14 on the right edge as viewed in FIG. 5. The depth of the housing structure 14 is less than the full depth of the cabinet core 11, leaving an exhaust duct 16 at the rear. An exhaust opening is provided on the lower rear side of the exhaust duct 16. A circulating fan 17 is located in an outlet slot in the top of the housing structure 14 to direct air upwards from the structure 14. A washable air filter 18 is mounted in a lower part of the front panel 12 of the cabinet core 11 to the left side of the housing structure 14.

Figure 1:
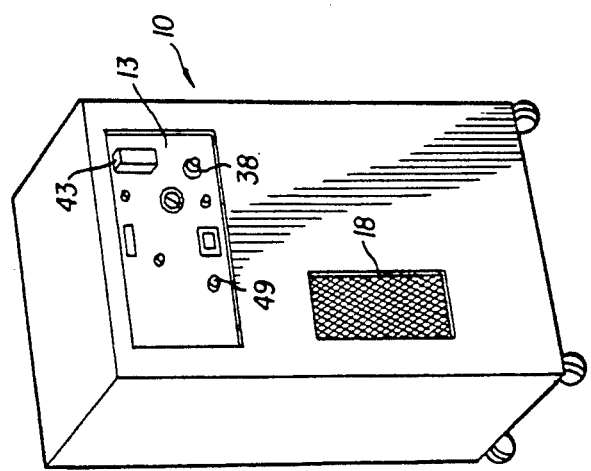
FIG. 1 is a front perspective view of an apparatus according to the invention.
Figure 2:
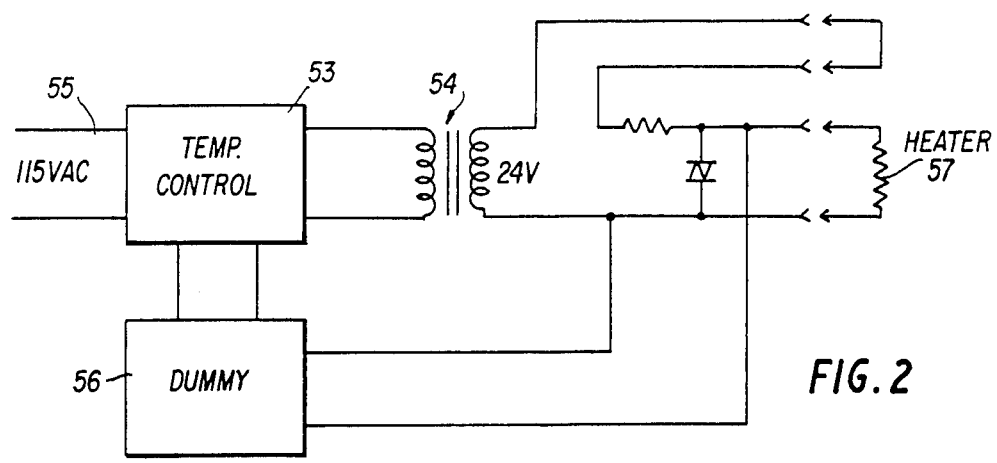
FIG. 2 is a schematic circuit diagram of the control circuit used with the invention.

Referring to FIGS. 1 and 5, a cabinet cover 19 of cubical shape, which is open at the front and bottom, is dimensioned to be slid down over the cabinet core 11 and expose the front panel 12 while meeting the lower edges of the cabinet core 11 and the edges of the front panel 12.

A membrane stack box 20 fits into the space within the cabinet cover 19 and to the side of the housing structure 14. The depth of the membrane box 20 is less than the full depth of the cabinet core 11, leaving an atmospheric air inlet duct adjacent to and extending the entire height of the front panel 12.

Figure 3:
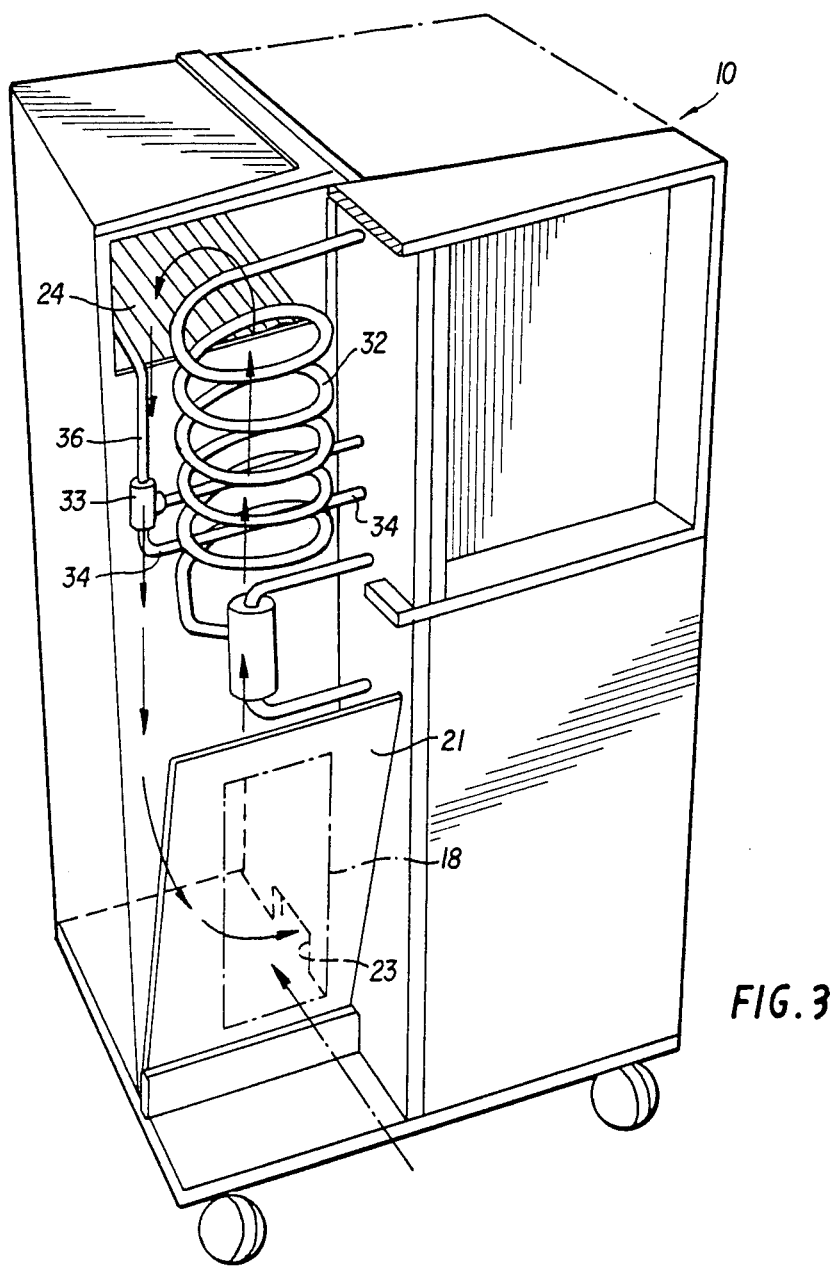
FIG. 3 is a front perspective view of the apparatus of FIG. 1 with the cover removed to show the interior of the apparatus.

A replaceable internal filter 21 (FIGS. 3 and 5) is located in the atmospheric air inlet duct formed by the cabinet core 11, membrane stack box 20 and cabinet cover 19. The latter captures the internal filter 21 which intercepts all air rising through the duct.

The stack box 20 has an inlet port 22 at the top of the front surface and an outlet port 23 at the bottom of the right hand surface as viewed in FIG. 5 and otherwise encloses a parallel array of membrane cells 24.

Each cell 24 consists of a membrane supported on microporous material, porous mat material, and screens bonded around their periphery to a sheet of aluminum. The cavity formed between the membranes and aluminum is connected by a vacuum tube which passes through the bonded border. The cells 24 are of known construction, such as described further in U.S. Pat. No. 3,976,451.

Figure 6:
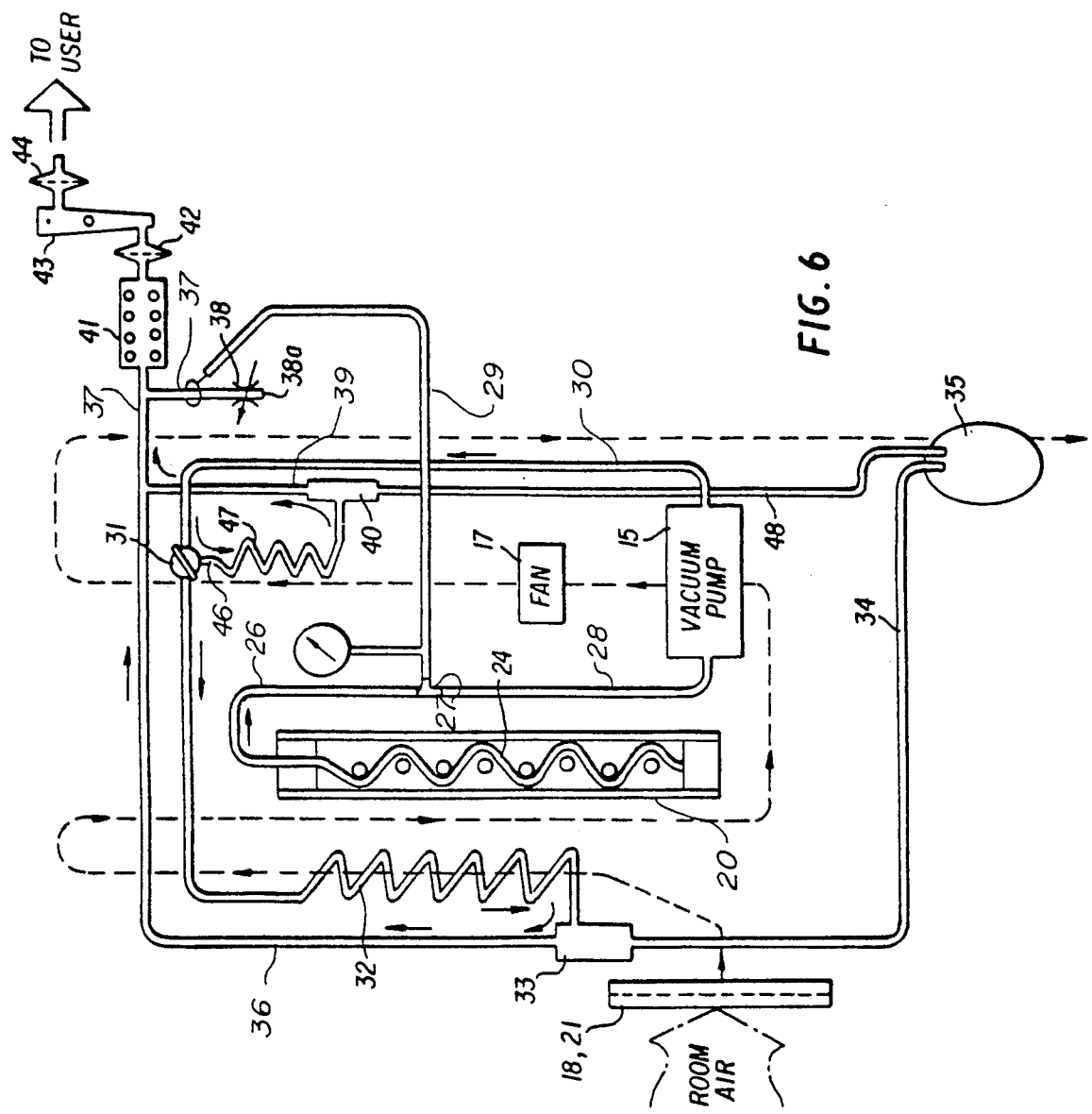
FIG. 6 is a schematic diagram of the components of the apparatus of FIG. 1.
Figure 4:
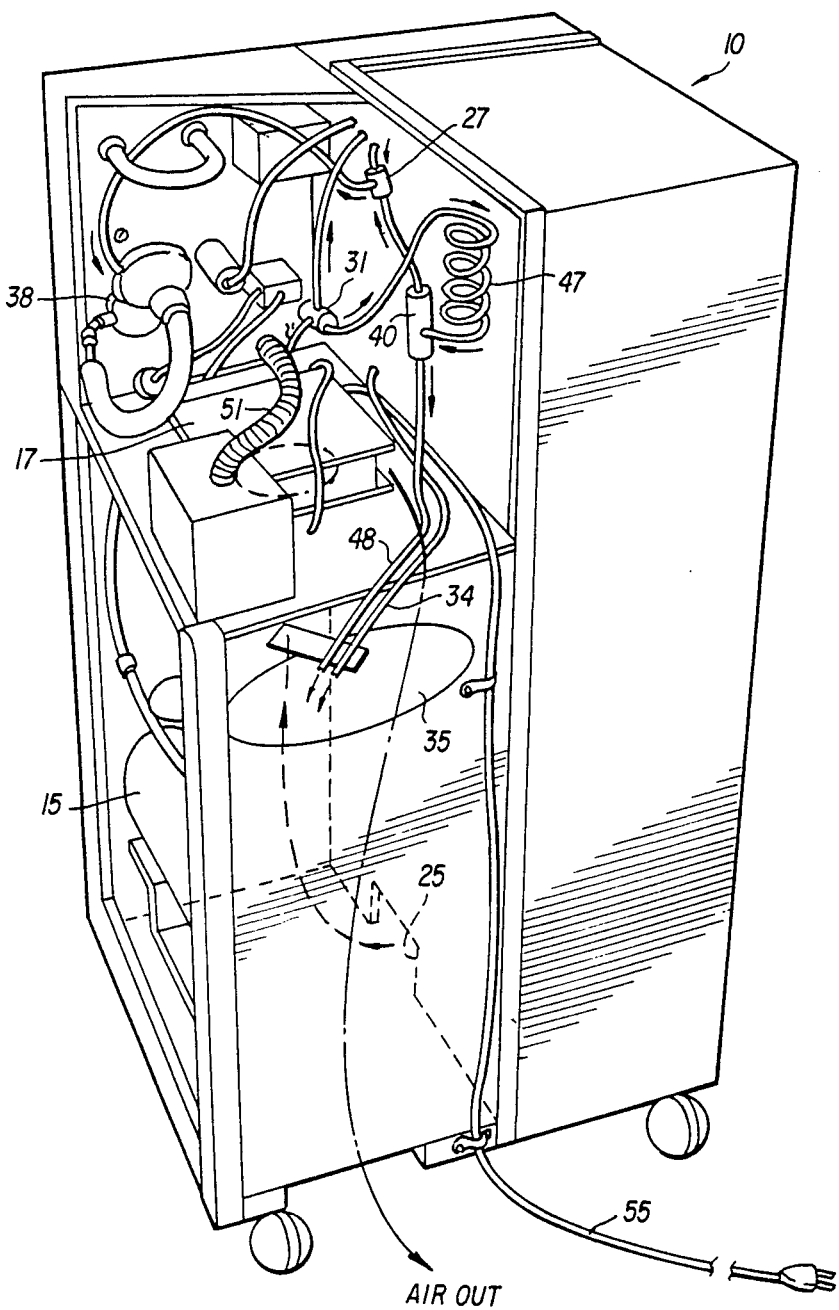
FIG. 4 is a rear perspective view of the apparatus of FIG. 1 with the cover removed to show the interior of the apparatus.

The outlet port 23 communicates with and is preferably gasketed to a mating slot 25 in the bottom of the housing structure 14. The membrane cells 24 are joined to a conduit comprising a manifold of small tubes on the stack vacuum line 26 which is connected by a "T" connector 27 to a vacuum line 28 of the pump 15. The side outlet of the "T" 27 is fitted to a small instrument vacuum line 29 which, in turn, connects to a vacuum gauge on the face of the control panel 13. A vacuum alarm switch may be connected to vacuum line 29 also. A discharge line 30 from the pump 15 is fitted to a humidity control valve or proportioning valve 31, and from one side of the valve to the upper end of coiled condenser 32 located in the atmospheric air inlet duct. The lower end of condenser 32 is fitted to the center of a water separator 33 which is fitted to a means, such as a wick tube assembly 34 for removing water from the trap 33. The wick tube assembly 34 extends to evaporator pad 35 (FIG. 4) located in the exhaust duct 16 and is formed by a flexible tube, e.g. of plastic, and a wick of suitable material within the tube to convey water under capillary action from the trap 33 to the evaporator pad 35. The upper end of water separator 33 is fitted to a line 36 which extends to a branch line 37 leading to an adjustable relief valve 38 (FIG. 6), and a branch 39 leading to the top of a further water separator or trap 40. In operation, relief valve 38 regulates flow to a patient by dumping unwanted flow into the nitrogen-rich exhaust stream via a dump line 38a which exits into the exhaust duct 16. The line 36 also extends to a fixed bed scrubber 41, in parallel with the relief valve 38. The scrubber 41 functions to remove trace quantities of SO$_2$ and NO$_2$ that may be extracted from room air and not removed with the water condensate. The scrubber 41 is connected by conduit means to a bacterial filter 42 and a flow meter 43. The outlet of flow meter 43 is connected to a female connector 44 in the control panel 13 which acts as an oxygen-rich output connector for the apparatus.

Connector 44 may be adapted to receive a disposable bacterial filter (not shown) to provide a hose barb connector for a patient's delivery tubing and administration set such as an oxygen inhalation mask. The function of the bacterial filter is to prevent contamination of the machine by back flow from the tubing of the administration set. This might occur when the tubing is coiled and stored on top of the apparatus during periods when the patient is not using the apparatus.

As stated, the membrane stack box 20 and housing structure 14 are arranged so as to form a vertical inlet duct at the front and a vertical exhaust duct 16 at the back when the cabinet cover 19 is in place. This configuration has the advantage that several functions are served by the stack box and housing structure, other that containing membrane cells 24 and a vacuum pump 15. For instance:

(1) the long vertical inlet duct locates the inlet filter 18 low where room air is usually coolest and in front where the need for cleaning can be seen and removal for cleaning is easily accomplished. This inlet location is recessed and is the location on the apparatus least likely to be blocked by other objects in the room. The duct and inlet port arrangement provides a natural location for the internal secondary filter 21 which requires only a single bracket for positioning and sealing. The upper portion of the inlet duct also provides a natural location for the coiled condenser 32 and water-separating trap 33;

(2) the exhaust duct provides a convenient location of the evaporator pad 35;

(3) airborne pump and fan noise must go through sound absorbing 180° turns both in the inlet and exhaust without the addition of sound baffles;

(4) the control panel is located at the warmest locations so as to minimize condensation problems. The control panel is also at the highest location for visibility and access; and (5) the cabinet cover can be removed without disturbing electrical connections and the apparatus can be operated for servicing and calibration.

The housing structure 14 is sealed by an acoustic panel 45 that enables enricher operation when the cabinet cover 19 is removed. The acoustic panel 45 also provides a convenient location for instructions and schematic diagrams for servicing the oxygen-enricher apparatus.

A second branch line 46 leads from the humidity control valve 31 to the top of a high temperature condenser coil 47. The bottom of the coil 47 is connected with the water separator or trap 40, which has a wick tube assembly 48 leading to the evaporator pad 35. The coil 47 is located in the path of exhaust air from the apparatus. Control for the proportioning or humidity control valve is achieved via control knob 49 accessible through the panel 13. Warm, high humidity air may thus be circulated from trap 40 via lines 39 and 37 to the scrubber 41 and related accessories 42, 43 and 44 and then to the patient. The relative amounts of air, from 0% to 100%, provided from each condenser 32 and 47 may be controlled by the proportioning valve 31. Since the temperature of coil 47 is higher than that of coil 32, the partial pressure and thus the humidity of the air leaving coil 47 will be higher than that leaving coil 32.

Figure 7:
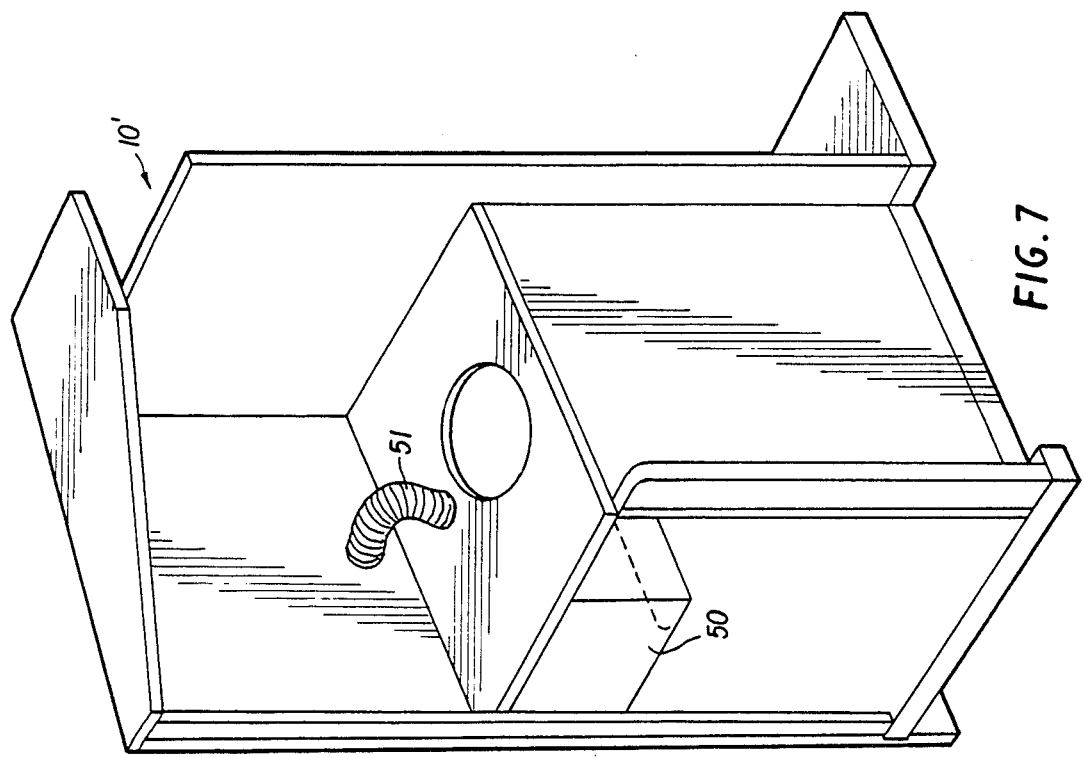
FIG. 7 is a rear perspective view of a modified construction, showing a placement of a blower for circulating warm air over the delivery tubing, with the remaining elements removed for the sake of clarity.

The air supplied to the patient may be heated in a number of ways, including circulation of warm air over the delivery tubing, use of electrical resistance heaters, and circulating warm liquid colinearly with the delivery tubing. In FIG. 7 the former is illustrated at 10'. A blower 50 is located in the lower chamber containing the vacuum pump, for maximum utilization of the heat from the pump, and an air duct 51 leads from the blower, through the front panel 13 and to a tube (not shown) which coaxially surrounds the oxygen-enriched air delivery tubing.

Figure 8:
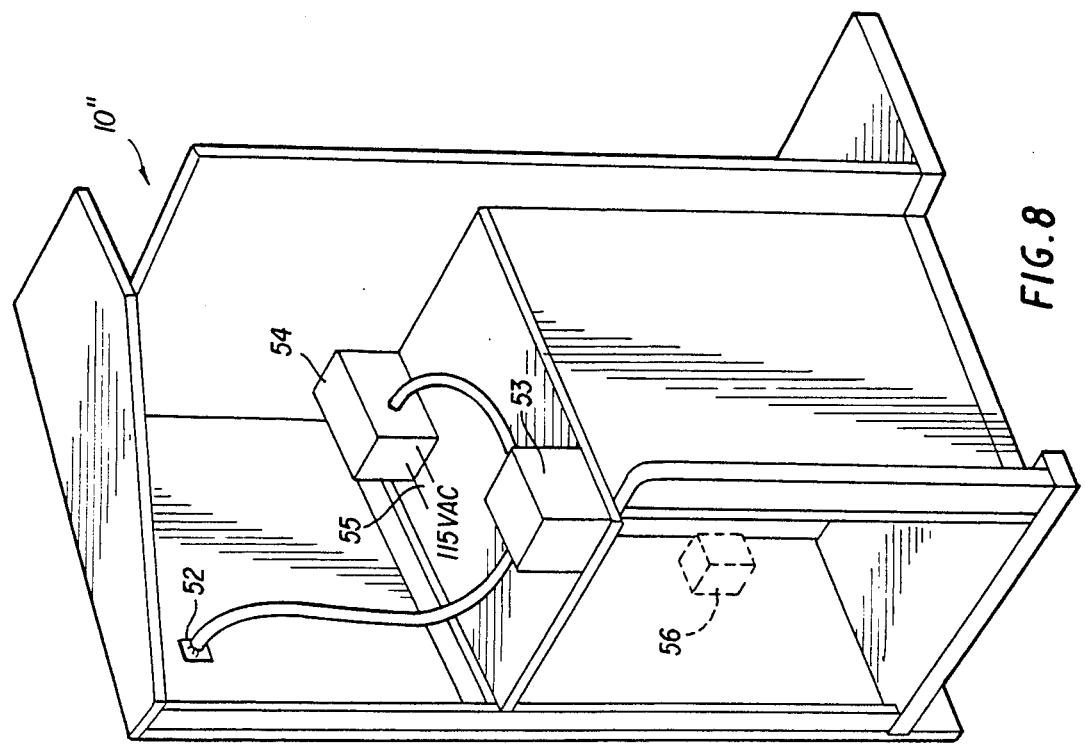
FIG. 8 is a view similar to FIG. 7, showing a further form of the invention, wherein electrical means is used to heat the air delivered to the patient.

Electrical resistance heating is accomplished by use of the apparatus 10″ shown in FIG. 8. An electrical outlet 52 is provided on the panel 13, connected via control circuit 53 and transformer 54 to a source 55 of power. A dummy cannula 56 may be provided in the cabinet to sense inlet air temperature and control operation of the heater 57 via the control circuit 53.

Figure 9:
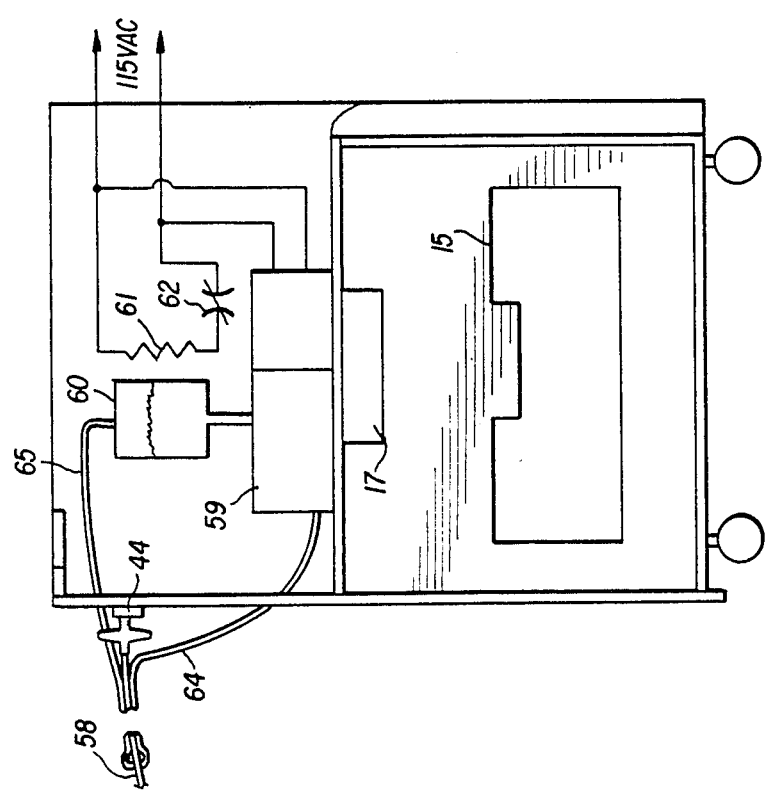
FIG. 9 is a diagram of a construction showing a further form of the invention wherein water is used to heat the air delivered to the patient.

Liquid heating of the air supplied to the patient is illustrated in FIG. 9. Warm water is circulated through a tubing jacket 58 comprised of feed and return tubes which trace the delivery air line by means of a motor-driven pump 59 whose inlet is connected to a water reservoir 60. The temperature of water in the reservoir is maintained by a heater 61 controlled by a thermostat 62. The return tube 65 connects to the reservoir inlet 63.

Figure 10:
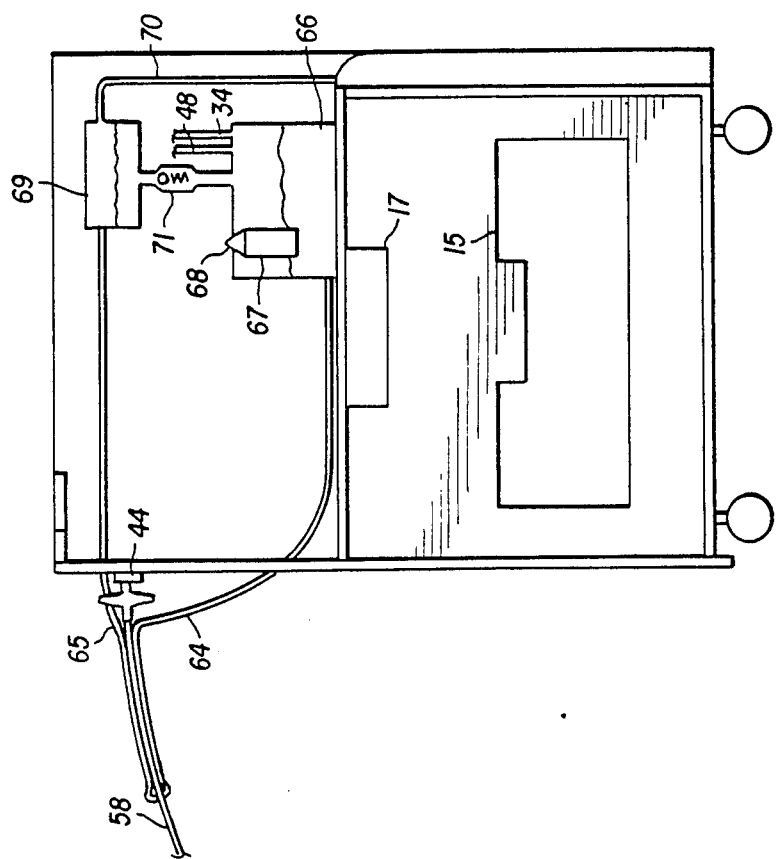
FIG. 10 is a diagram of a construction wherein the output of the wick tubes is used to heat the air delivered to the patient.

Waste output air from an oxygen enricher may be used to circulate the warm water. FIG. 10 illustrates the use of output that is normally wasted in the water removal process. Here condensate and output air from the wick tubes 34 and 48 enter a lower water reservoir 66. A float valve 67 controls passage of air through a vent 68. When the reservoir 66 is full of water, the vent will be closed, and the water in the reservoir is forced by pressure generated by the pump means 15 through feed tube 64 of water jacket 58. Return tube 65 delivers the water to upper reservoir 69, which is open to atmosphere through overflow tube 70 which leads to evaporator pad 35. Float valve 67 opens when the water level drops. Lower reservoir 66 is vented through vent 68. The resulting loss of pressure allows water to flow from upper reservoir 69 through check valve 71 to lower reservoir 66 until the water level rises enough to cause float valve 67 to close vent 68. The cycle then repeats. For installations inside an enricher, the water may be heated electrically or by use of reject heat generated by pump means 15.

The operations or functions of the cells 24 and wick tube assemblies 34 and 48 are more fully explained in our U.S. Pat. No. 4,174,955, and detailed explanation herein is not believed necessary.

Further, while the present invention has been described in association with a particular preferred embodiment, those skilled in the art will appreciate that such embodiment is susceptible to changes and substitutions of equivalents without departing from the scope of the present invention. Consequently, it is intended that the herein disclosed invention be defined in the following appended claims.

What is claimed is:

1. An oxygen enriching apparatus having humidity control means, comprising:
   housing means having an ambient air inlet;
   a membrane cell stack supported in the housing for increasing the proportion of oxygen and water vapor in air passed therethrough;
   pump means in the housing for causing ambient air to permeate through the membrane stack;
   air circulation means for causing air to enter said housing, to circulate over the membrane stack and to circulate over the pump means to cool the pump means;
   first and second condenser coils supported in the housing, the first condenser coil being disposed in the path of the ambient air entering the housing and being connected to receive at least a portion of oxygen-enriched air which has passed through the membrane stack, whereby some of the moisture is condensed out of the oxygen-enriched air;
   said second condenser coil being supported in the path of air from the air circulation means which has passed over the pump means and been warmed thereby, and being connected to receive at least a portion of the oxygen-enriched air from the membrane stack, the humidity of the air leaving the second condenser coil being higher than that leaving the first coil because of the higher temperature thereof;
   both said condenser coils being connected with water separators to remove excess water from the air exiting the coils; and
   a proportioning valve connected with the coils to cause desired relative amounts of air from the two coils to flow to delivery tubing to the user, depending upon the humidity desired in the delivery air.

2. An oxygen enriching apparatus as defined in claim 1, wherein:
   electrical heater means is in the path of the delivery air to electrically heat the delivery air before it is delivered to the user.

3. An oxygen enriching apparatus as defined in claim 1, wherein:
   delivery tubing is connected with the apparatus for delivering conditioned air to the user; and
   exhaust means is connected with the apparatus for exhausting warm exhaust air from the apparatus, said delivery tubing being in the path of the warm exhaust air whereby air passing through the delivery tubing is heated.

4. An oxygen enriching apparatus as defined in claim 1, wherein:
   delivery tubing is connected with the apparatus for delivering conditioned air to the user; and
   warm water circulating means is connected with the delivery tubing to circulate warm water over the delivery tubing to heat conditioned air flowing therethrough.

5. An oxygen enriched apparatus as defined in claim 4, wherein:
   the warm water circulating means comprising tubing colinear to and contiguous with the delivery tubing.

6. An oxygen enriching apparatus having humidity control means, comprising:
   housing means having an ambient air inlet;
   a membrane cell stack supported in the housing for increasing the proportion of oxygen and water vapor in air passed therethrough;
   air circulating means for causing ambient air to enter the housing and circulate through the membrane stack, producing oxygen enriched air;
   means for dividing the oxygen enriched air into two separate streams;
   condenser means comprising first and second condenser coils supported in the housing, the first condenser coil being disposed in the path of the ambient air entering the housing and connected to receive at least a portion of oxygen enriched air which has passed through the membrane stack, whereby some of the moisture is condensed out of the oxygen enriched air, and the second condenser coil being supported in the path of air from the air circulating means which has been warmed in the apparatus and connected to receive at least a portion of the oxygen enriched air from the membrane stack, the humidity of the air leaving the second condenser coil being higher than that leaving the first condenser coil because of the higher temperature thereof; and
   proportioning means for admixing the two streams of oxygen enriched air in a desired proportion to obtain a flow of oxygen enriched air having a desired humidity level for supply to a user.

* * * * *